3,329,640
VINYL ACETATE POLYMER EMULSIONS CONTAINING ETHOXYLATED MONOALKYL SULFOSUCCINATE AS EMULSIFIERS
Frank Scotti, Westport, and Frederick Lyle Andrew, Norwalk, Conn., assignors to American Cyanamid Company, Stamford, Conn., a corporation of Maine
No Drawing. Filed Feb. 26, 1965, Ser. No. 435,714
14 Claims. (Cl. 260—29.6)

This invention relates to synthetic latices and processes for preparation. More particularly, this invention relates to synthetic latices prepared by the aqueous emulsion polymerization or copolymerization of vinyl monomers and mixtures of vinyl monomers.

There is at present a rapidly expanding interest in water-based synthetic resins on the part of the adhesive, paint, paper and textile industries. Such water-based synthetic resin compositions, commonly termed latices, must exhibit a balance of various properties in order to impart desired qualities to films resulting therefrom and to surfaces or articles prepared or treated therewith.

The latex properties which must be controlled include particle size, mechanical stability, freeze-thaw stability, shelf life, heat stability, pigment acceptability, divalent ion stability, compatibility, foaming, viscosity and thixotropy. Among the properties required of the cured films prepared from the latices may be mentioned adhesion, heat stability, water resistance, tensile strength, dimensional stability (such as percent elongation), plasticization properties including glass transition temperature and minimum film-forming temperature, Sward hardness, gloss, clarity, tack, grain and vapor transmission.

While the latex art has developed numerous compositions satisfying one or more of the foregoing requirements in the latex and in the resulting film, serious deficiencies still exist in several of the properties so as to prevent achievement of the desired high degree of excellence. Particular properties which prevent balanced performance are mechanical stability of the latex, i.e., resistance of the emulsion to breaking through shear by automatic equipment, and heat stability and gloss of films prepared from the latices. Heat stability, i.e., resistance to discoloration (yellowing), and gloss, i.e., luster, clarity and smoothness of the cured synthetic resin film surface, are particularly important where the latices are to be used in paints and in the coating or impregnation of paper and nonwoven fabrics. Both the mechanical stability of the latex and the gloss of the films prepared from the latices are direct consequences of control of particle size of the polymerized materials in the latex. Thus it is known that too large a particle size will retard emulsion polymerization, i.e., will lead to breaking of the emulsion. On the other hand, too small a particle size will result in poor mechanical stability. However, gloss generally improves with smaller particle size. It is apparent, therefore, that controlled particle size is important for attainment of good latex mechanical stability coupled with high gloss in the films prepared herefrom.

Of critical importance for the attainment of a balance of all the properties mentioned above with respect to both the latices and the resultant films is the choice of emulsifying agent for the emulsion polymerization of the vinyl monomers. Although a great variety of "general purpose" emulsifying agents are known, the suitability of such emulsifying agents in the emulsion polymerization of vinyl monomers is unpredictable due to the numerous properties which they must impart to the latex before the latex can be used to prepare satisfactory films. In particular, there is lacking a class of emulsifiers which may be used in emulsion polymerization to provide balanced performance including the important properties of small particle size and mechanical stability of the latex, and the gloss and resistance to yellowing of the resulting films.

An object of the present invention is to provide synthetic latices having improved mechanical stability and small particle size, the cured films of which exhibit excellent gloss and improved resistance to yellowing.

A further object of the invention is to provide an emulsion polymerization process which results in synthetic latices exhibiting improved mechanical stability and small particle size together with other desirable properties.

These and other objects and advantages will become apparent from the detailed exposition which follows.

In accordance with the present invention it has been discovered that a certain class of emulsifiers for the emulsion polymerization of vinyl monomers promotes the balance of properties described above and, in particular, improved mechanical stability and controlled particle size in the latex as well as improved heat stability and gloss in films prepared from the latices. The emulsifiers of the present invention may be characteriszed as half esters of sulfosuccinic acid, i.e., half-acid sulfosuccinates of the following structural formula:

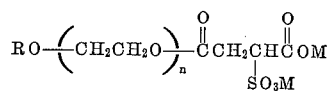

wherein R is selected from the group consisting of $C_6$–$C_{20}$ alkyl and $C_8$–$C_{10}$ alkyl-substituted phenyl, M is selected from the group consisting of hydrogen and a salt-forming radical, at least one of M being said salt-forming radical, and $n$ is a positive integer from 0 to 30.

The salt-forming radical M which is not hydrogen includes any of the common monovalent cations. These include alkali metal cations, e.g., sodium, potassium, and the like, as well as ammonium, substituted ammonium, and quaternary ammonium cations. Among substituted ammonium cations may be mentioned methyl, dimethyl, trimethyl, tetramethyl, ammonium cations and the like. Quaternary ammonium cations include dimethyl piperdinium cation and cations derived from various amines such as ethylamine, diethylamine, triethylamine, mixtures thereof, and the like. The salt-forming radical has the function of dispersing the emulsifier in the aqueous phase of the emulsion polymerization mixture and may be varied for compatibility with the other ingredients of the mixture such as polymerization catalysts, promoters, regulators and the like. The sodium salt of the half-acid sulfosuccinates is particularly preferred.

Certain members of the above class of compounds as well as general methods for preparing the class of compounds are known, for example as disclosed in U.S. Patent 2,176,423 to Jaeger. The compounds per se and methods of preparation form no part of the present invention. The above structural formula is intended to include isomers thereof and in particular the isomer wherein the sulfo group is attached to the next adjacent carbon atom, i.e., the carbon atom alpha to the carbonyl group in the lipophylic ester portion of the molecule. These and other isomeric variations of the half-acid succinates of the invention will be found in the mixtures of products resulting from the preparation of the compounds as will be obvious to those skilled in the art.

It will be seen from the structural formula above that the emulsifying agents are anionic, having a hydrophylic group on one end of the molecule and a lipophylic group at the opposite end of the molecule. The lipophylic portion of the molecule is derived from straight and branched chain aliphatic and aromatic alcohols or ethoxylated derivatives thereof. The lipophylic portion of the molecule shown above is, of course, the residue of such alcohols or ethoxylated derivatives thereof resulting from the mono esterification of maleic anhydride (followed by sulfonation) or mono esterification of sulfosuccinic acid by these alcohols or ethoxylated derivatives thereof.

The general structural formula of the alcohols or ethoxylates is as follows:

$$RO(CH_2CH_2O)_nH$$

wherein R and $n$ are as defined above.

A large variety of materials defined by the above formula are commercially available. Among these may be mentioned fatty alcohols such as hexanol, methyl amyl alcohol, ethylbutanol, heptanol, ethylhexanol, undecanol, dodecanol, tetradecanol, heptadecanol, and the like, including the straight and branched chain isomers thereof. Of particular interest among the class of $C_6$–$C_{20}$ fatty alcohols are mixtures of primary straight chain alcohols sold commercially as "Alfol" alcohols. Particularly preferred alcohols of this series are the mixtures containing $C_{10}$ to $C_{14}$ alcohols. Other alcohols are the aromatic alcohols wherein the alkyl group attached to the phenyl ring contains from eight to ten carbon atoms. Such alcohols include, for example, octylphenol, nonylphenol and decylphenol, including the branch chain isomers and the ortho, meta and para position isomers thereof. Of particular interest among these alcohols is nonylphenol.

The lipophylic portion of the emulsifying agents also includes residues of ethylene oxide adducts of the foregoing alcohols. Such adducts are well known and are prepared by the reaction of up to about 30 moles of ethylene oxide per mole of alcohol and preferably from about 1 to 10 moles of ethylene oxide per mole of alcohol. The ethoxylates are sold under various trade names, generally as admixtures. Of particular interest are the ethoxylates sold as "Alfonics" wherein the ethylene oxide content generally ranges from about 40% to 80% by weight of the ethoxylate and the alcohol is an 'Alfol' series alcohol. Other preferred ethoxylates are the "Surfonics" which are adducts of nonylphenol and from about 16% to 85% by weight of ethylene oxide.

The present invention is directed broadly to the emulsion polymerization of vinyl monomers including mixtures of different vinyl monomers. Such monomers generally comprise ethylenically polymerizable organic compounds containing the $CH_2=C<$ group. Typical of such momoners from which may be prepared the synthetic latices of the invention are the following: styrene, methylstyrene, chlorine-substituted styrene, and mixtures of such monomers with butadiene, acrylonitrile, and the like; vinyl chloride, vinyl acetate, and vinylidene chloride, mixtures thereof, and mixtures with other monomers such as acrylonitrile, methyl methacrylate, butadiene, isobutylene, maleic esters such as diethyl maleate and dibutyl maleate, and the like; acrylonitrile, methacrylonitrile, and mixtures thereof with butadiene, isobutylene, vinylidene chloride, chloroprene, maleic esters such as diethyl maleate and dibutyl maleate, and the like; acrylates such as methyl acrylate, methyl methacrylate, ethyl acrylate, butyl acrylate, isobutyl methacrylate, dibutyl methacrylate, phenyl methacrylate, tertiary amyl methacrylate, 2-ethyl hexyl methacrylate, mixtures thereof, and mixtures, for example, with styrene, 2-methyl styrene, butadiene, acrylonitrile, and vinyl acetate; butadienes, particularly, the butadienes, 1,3, such as methyl-2-butadiene-1,3 (isoprene), piperylene, 2,3-dimethyl-butadiene-1,3, mixtures thereof, and mixtures with styrene, 2-methyl styrene, acrylonitrile, methyl methacrylate, ethyl acrylate, vinyl naphthalene, methacrylamide, vinylidene chloride, methyl vinyl ether, methyl vinyl ketone, and the like; chloroprene and other halogen-2-butadienes, such as the analogs and homologs of chloroprene, 2,3 - dichloro - 1,3 - butadiene, mixtures thereof, and mixtures with styrene, acrylonitrile, and the like.

It will be appreciated that the vinyl monomers include those which are essentially water insoluble, those which have significant water solubility but whose polymers are insoluble, and monomers that give a polymer which is insoluble in and only slightly swollen by the monomer. Many of the foregoing particular monomers, mixtures of different monomers, and the like are set forth above but it will be understood that the invention encompasses any of the other well known monomers or mixtures which form synthetic latices by emulsion polymerization.

Particularly preferred monomers or monomer mixtures are vinyl acetate, vinyl chloride, butadiene-styrene, and the acrylics, particularly mixtures with vinyl acetate such as vinyl acetate-ethyl acrylate, vinyl acetate-2-ethyl hexyl acrylate, vinyl acetate-dibutyl maleate, vinyl acetate-acrylate ester-acrylic acid, vinyl acetate-acrylate ester-methacrylic acid, vinyl acetate-acrylate ester-itaconic acid, vinyl acetate-acrylamide, and vinyl acetate-methylol acrylamide.

With the exception of the particular class of emulsifiers, the emulsion polymerization procedures will be any of those conventionally employed in the art. Thus, batch, semi-continuous or delayed monomer addition techniques may be employed. Delayed monomer addition includes adding monomers separately, premixing the monomers or pre-emulsifying the monomers.

The proportions of the emulsifier will be small but variable within a fairly wide range and are not critical. In general, good results are obtained using proportions of from about 0.3% to 4% based on the weight of the monomers used in the polymerization reaction. The pH at which the polymerization is carried out is variable, i.e., the solution may be either neutral, slightly alkaline, or slightly acidic depending upon the particular monomers being polymerized or copolymerized. Likewise, the temperature of the emulsion polymerization is widely variable and may range from about −10° C. to 175° C. or more. Preferably the polymerization reaction will be carried out at from about room temperature, 25° C. to about 100° C.

Polymerization is effected in the normal manner in the presence of catalytic amounts, e.g., 0.01% to 2% on monomer weight, of a polymerization agent such as the well known free radical catalysts. Among such catalysts may be mentioned peracetic acid, hydrogen peroxide, organic peroxides such as benzoyl peroxide and cumene hydroperoxide, and persalts such as ammonium persulfate, sodium persulfate, potassium persulfate, potassium perborate, and the like.

Any of the other conventional regulators, stabilizers, and activators or supplemental agents conventionally employed in emulsion polymerization procedures can be used in the process of the invention. Among the stabilizers are the so-called protective colloids such as gelatin, casein, starch, carboxylmethyl cellulose, bum arabic, gum tragacanth, and the like. The regulators include such compounds as diisopropyl xanthate, the higher mercaptans such as benzyl mercaptan, octyl mercaptan, decyl mercaptan, dodecyl mercaptan, cetyl mercaptan, octadecyl mercaptan, carbon tetrachloride, ethylene dichloride, hexachlorethylene, $C_5$ to $C_8$ aliphatic alcohols, and the like.

The emulsion polymerization agents of the present invention are not to be confused with diesters of sulfosuccinic acid which have the following structure:

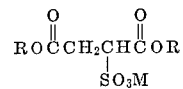

wherein R and M are as already defined. While the dialkyl sulfosuccinates have considerable value as emulsifiers in detergent compositions and the like, the half-acid sulfosuccinates of the present invention are surprisingly superior when employed as the surfactants in emulsion polymerization with respect to the balance of properties imparted to the synthetic latices and to the cured polymeric films resulting therefrom.

As will be seen in the following examples, the emulsion polymerization agents of the present invention permit substantial reduction in the particle size of the synthetic latices while maintaining good mechanical stability. This is an important consequence since too small a particle size usually detracts from the mechanical stability of the latex. However, small particle size is desirable because if imparts gloss to cured films prepared from the latice. In addition, the emulsion polymerization agents of the present invention impart greatly improved resistance to yellowing to cured films prepared from the latices. Thus, very beneficial properties are imparted to latices and to films prepared from these latices when the emulsion polymerization agents of the present invention are employed as opposed to the dialkyl sulfosuccinates and other emulsifiers. These properties are highly desirable, for example, in water-based paints and in coatings for nonwoven textiles and paper. With respect to paints, the instant class of emulsifiers now permits the preparation of latex gloss paints which behave like organic solutions, i.e., like alkyd paints, allowing rapid and even application without the resulting tendency of the film to lift and tear where one stroke laps another.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

PREPARATION OF EMULSIFIER A: DISODIUM ALFONIC 1014-4 ETHOXYLATE SULFOSUCCINATE

| | Parts |
|---|---|
| Alfonic 1014-4 ethoxylate [1] | 3130 (10 moles) |
| Maleic anhydride | 1020 (10.4 moles) |
| Sodium sulfite (anhydrous) | 1310 (10.4 moles) |

[1] Mixture of liquid ethylene oxide adducts of $C_{10}$-$C_{14}$ primary straight chain fatty alcohols containing 40% by weight of ethylene oxide and having an average molecular weight of about 313 and hydroxyl number of 179.

*Part A: Esterification.*—The Alfonic 1014-4 ethoxylate is charged to a suitable reaction vessel equipped with agitator, condenser, thermometer, gas inlet tube and means for heating. The maleic anhydride in suitable form is then added. While heating with condenser water on, purging of the reaction vessel with nitrogen is begun. As the maleic anhydride becomes liquid (about 58-60° C.), agitation is begun. Heating of the reaction mixture is continued to about 90-100° C. and this temperature is maintained until esterification is complete which usually requires about 4 hours. Conversion to the half acid ester is determined by following the disappearance of acid via titration with standard base.

*Part B: Sulfonation.*—To a suitable reaction vessel equipped as in Part A is charged the anhydrous sodium sulfite and 8190 parts of water (sufficient to give a final solution of 40% total solids). The mixture is purged with nitrogen, agitated and heated to 90-100° C. Over about 15-20 minutes the half acid ester, prepared in Part A above, is added in a steady stream while maintaining the reaction mixture at a temperature of about 90-100° C. Sulfonation is generally complete in 1 to 1½ hours after addition is finished. Conversion is followed by titrating residual sulfite with standard iodine solution (0.1 N) to the starch end point.

EMULSIFIER B: DISODIUM ALFONIC 1012-6 ETHOXYLATE SULFOSUCCINATE

| | Parts |
|---|---|
| Alfonic 1012-6 ethoxylate [1] | 3980 (10 moles) |
| Maleic anhydride | 1020 (10.4 moles) |
| Sodium sulfite (anhydrous) | 1310 (10.4 moles) |

[1] Mixture of liquid ethylene oxide adducts of $C_{10}$-$C_{12}$ primary straight chain fatty alcohols containing 60% by weight of ethylene oxide and having an average molecular weight of 398 and hydroxyl number of 141.

EMULSIFIER C: DISODIUM SURFONIC N-95 ETHOXYLATE SULFOSUCCINATE

| | Parts |
|---|---|
| Surfonic N-95 ethoxylate [1] | 6230 (10 moles) |
| Maleic anhydride | 1020 (10.4 moles) |
| Sodium sulfite (anhydrous) | 1310 (10.4 moles) |

[1] Mixture of liquid nonylphenol-ethylene oxide adducts containing 9-10 moles of ethylene oxide per mole of nonylphenol and having an average molecular weight of 623 and hydroxyl number of 90.

Preparation of Emulsifiers B and C is accomplished in substantially the same manner as set forth above with respect to Emulsifier A.

PREPARATION OF EMULSIFIER D: DISODIUM ALFOL 1214 SULFOSUCCINATE

| | Parts |
|---|---|
| Alfol 1214 [1] alcohol | 1970 (10 moles) |
| Maleic anhydride | 1020 (10.4 moles) |
| Sodium sulfite (anhydrous) | 1310 (10.4 moles) |

[1] Mixture of $C_{12}$-$C_{14}$ primary straight chain fatty alcohols having a hydroxyl number of 285 and an average molecular weight of 197.

*Part A: Esterification.*—The Alfol 1214 alcohol mixture and maleic anhydride are charged to a suitable reaction vessel equipped with agitator, condenser, thermometer, gas inlet tube and heating means. The reaction vessel is then purged with a slow stream of nitrogen while heating the mixture with condenser water on. When the maleic anhydride dissolves (about 58 to 60° C.) agitation is begun. Heating of the reaction mixture is continued at 90 to 100° C. for about 4 hours after which time conversion to half acid ester is substantially complete.

*Part B: Sulfonation.*—Sodium sulfite and 6540 parts of water (to give a final solution of 40% total solids) are added to a suitable reaction vessel equipped as in Part A. The mixture is then purged with nitrogen while being agitated, and is heated to 90 to 100° C. The half acid ester prepared in Part A is then added to the mixture over a 15 to 20 minute-period while maintaining the temperature at 90 to 100° C. Sulfonation is generally complete in 1 to 1½ hours after the addition.

PREPARATION OF EMULSIFIER E: DISODIUM NONYLPHENOL SULFOSUCCINATE

| | Parts |
|---|---|
| Nonylphenol (commercial) | 2200 (10 moles) |
| Maleic anhydride | 1020 (10.4 moles) |
| Sodium sulfite (anhydrous) | 1310 (10.4 moles) |

*Part A: Esterification.*—The nonylphenol and maleic anhydride are charged to a suitable reaction vessel equipped with agitator, condenser, thermometer, gas inlet tube and means for heating. While heating the mixture with condenser water on, the reaction vessel is purged with a slow stream of nitrogen. When the maleic anhydride dissolves (about 58-60° C.), agitation is begun. Heating of the reaction mixture is continued at 90-100° C. for about 4 hours to form half-acid ester.

*Part B: Sulfonation.*—Sodium sulfite and 6795 parts of water (to give a final solution of 40% total solids) are added to a suitable reaction vessel equipped as in Part A. The mixture is purged with nitrogen and heated to 90-100° C. while being agitated. The half-acid ester prepared in Part A is then added to the reaction mixture over a 15- to 20-minute period while maintaining the temperature of the reaction mixture at 90 to 100° C. Sulfonation is generally complete in 1 to 1½ hours after the addition.

Emulsifiers A, B, C, D and E are then employed in Examples 1–9 for emulsion polymerization as follows.

*Example 1.—Vinyl acetate polymerization—Batch process*

| | Parts |
|---|---|
| Vinyl acetate | 100 |
| Sodium bicarbonate as 1% aqueous solution | 10 |
| Potassium persulfate as 1% aqueous solution | 30 |
| Emulsifier A as 5% aqueous solution | 60 |
| Water | 50 |

To a suitable reaction vessel is added the emulsifier solution, the sodium bicarbonate solution, the required amount of water and the vinyl acetate.

The mixture is then purged with nitrogen below its surface for 5 to 10 minutes. Following the purge, the potassium persulfate solution is added and the reaction vessel is capped securely. Thereafter the vessel containing the reaction mixture is placed in rotating holders in a water bath heated to 135° F. and is reacted at this temperature for 15 to 20 hours while slowly rotating the reaction vessel holders to achieve agitation of the reaction mixture. Following reaction, the reaction vessel is removed, cooled, and the resulting polymer latex is filtered to remove any coagulum.

*Examples 2 and 3*

Vinyl acetate is polymerized to a latex in substantially the same manner as in Example 1 except that Emulsifier A is replaced by Emulsifier B (Example 2) and in a separate preparation Emulsifier A is replaced by Emulsifier C (Example 3).

*Example 4*

Vinyl acetate and 2-ethylhexylacrylate are copolymerized to a smooth latex from the following ingredients using substantially the same procedure as in Example 1.

| | Parts |
|---|---|
| Vinyl acetate | 90 |
| 2-ethylhexyl acrylate, containing 50 p.p.m. hydroquinone | 10 |
| Sodium bicarbonate as 1% aqueous solution | 10 |
| Potassium persulfate as 1% aqueous solution | 30 |
| Emulsifier A as 5% aqueous solution | 40 |
| Water | 70 |

*Example 5.—Vinyl acetate polymerization—Continuous addition process*

| | Parts |
|---|---|
| Vinyl acetate | 100 |
| Sodium bicarbonate as 1% aqueous solution | 10 |
| Potassium persulfate as 1% aqueous solution | 30 |
| Emulsifier A as 5% aqueous solution | 60 |
| Water to 40% solids | 50 |

To a suitable reaction vessel equipped with two addition funnels and water condenser is added the sodium bicarbonate and the emulsifier solutions together with sufficient water to give a final latex containing 40% solids. The mixture is then purged with nitrogen below its surface for 5 to 10 minutes. Thereafter the potassium persulfate catalyst solution is placed in one addition funnel and 100 parts of vinyl acetate in the second addition funnel. The mixture in the reaction vessel is then agitated and heated while continuing the nitrogen purge.

When the temperature of the mixture reaches about 65–70° C., 10% of the potassium persulfate catalyst solution is added in small portions over 10 minutes. Thereafter the monomer and the catalyst solution are added in small portions at rates such that the addition of the monomer will be complete after 2 hours and the addition of the remaining catalyst solution will be 90% complete after 2 hours. The remaining 10% of the catalyst solution is added after 20 to 30 minutes further reaction. Agitation is then continued for 1 hour while maintaining a temperature of about 67–73° C. The reaction mixture is then cooled and filtered to remove any coagulum from the resulting polymer latex.

*Example 6.—Acrylonitrile-butadiene-styrene copolymerization*

| | Parts |
|---|---|
| Acrylonitrile | 30 |
| Butadiene | 30 |
| Styrene | 40 |
| Potassium persulfate | 0.5 |
| Dodecyl mercaptan | 0.5 |
| Emulsifier A (real) | 5.0 |
| Water | 143 |
| pH adjustment (tetrasodium pyrophosphate) | 1.0 |

The water is charged to the reaction vessel followed by the emulsifier and pyrophosphate. When the emulsifier has dissolved, the resulting solution is purged with nitrogen. The dodecyl mercaptan is then added, followed by the persulfate dissolved in a small portion of water. The styrene and acrylonitrile are added and then the butadiene is added in a slight excess, which excess is used to further purge the reaction vessel. The excess butadiene may be helped along with nitrogen to assure complete oxygen removal from the reaction vessel. The reaction vessel is then sealed and polymerization is started by heating to 50° C. by means of warm water circulating in the reaction vessel jacket. Upon completion of polymerization, which is effected in about 18 to 24 hours, the usual short stop may be added, and the batch is then cooled. If the latices are to be used for coating the batch is filtered.

*Example 7.—Butadiene-styrene copolymerization*

In essentially the same manner as in Example 6, butadiene and styrene are copolymerized to a smooth latex from the following recipe:

| | Parts |
|---|---|
| Butadiene | 35 |
| Styrene | 65 |
| Ammonium persulfate | 0.3 |
| Dodecyl mercaptan | 2.0 |
| Emulsifier A | 5.0 |
| Water | 125 |
| pH adjustment (tetrasodium pyrophosphate) | 7.5 |

*Example 8.—Butadiene-styrene-acrylic acid copolymerization*

(Monomer ratio: 30/65/5)

| | Parts |
|---|---|
| Water | 84.0 |
| Emulsifier B as 35% aqueous solution | 8.5 |
| Styrene | 65 |
| Tertiary dodecyl mercaptan | 0.5 |
| Butadiene | 30 |
| Sodium acrylate as 17% aqueous solution | 39 |
| Acrylic acid | 5 |
| Potassium persulfate | 0.5 |
| pH adjustment (sodium hydroxide) | 2.8 |
| Water | 35.7 |

The acrylic acid is dissolved in 20 parts of boiled or nitrogen-purged deionized water or equivalent and the sodium hydroxide is separately dissolved in 11.2 parts of boiled or nitrogen purged water. Then the sodium hydroxide solution is slowly added to the acrylic acid solution to a pH of 6.5 and the mixture is saved for addition to the reaction vessel at the time specified.

The catalyst solution is next prepared by dissolving the potassium persulfate in 4.5 parts of water and is saved for addition to the reaction vessel at the time specified.

The styrene is added to the Emulsifier B solution in a suitable reaction vessel which mixture is then purged with nitrogen for 5 minutes. Thereafter the tertiary dodecyl mercaptan is added. Next the butadiene, cooled to liquid form, is run in, including 2% excess (0.6 part), and the excess is permitted to boil off. This further purges the system free of oxygen. The specified amount of sodium acrylate solution is then added followed by the persulfate solution. The reaction vessel is then sealed and with slow agitation is heated to 135° F. for 13 to 22 hours or until reaction is complete as determined by reduction in pressure.

When reaction is essentially complete, 0.1 part benzoyl peroxide dissolved in a small amount of a suitable solvent is injected. The reaction mixture is heated to 170° F. for ½ hour and then cooled. The resulting latex contains about 45% polymer solids.

*Example 9*

In essentially the same manner as in Example 8, a butadiene-styrene-acrylic acid terpolymer is prepared using Emulsifier C and the following recipe:

| | Parts |
|---|---|
| Water | 107.4 |
| Emulsifier C as 35% aqueous solution (3.0%) | 8.5 |
| Styrene | 65 |
| Tertiary dodecyl mercaptan | 0.5 |
| Butadiene | 33 |
| Sodium acrylate as 17% aqueous solution | 15.6 |
| Acrylic acid | 5 |
| Potassium persulfate | 0.5 |
| pH adjustment (sodium hydroxide) | 2.8 |
| Water | 35.7 |

The resulting latex contains about 45% polymer solids.

*Examples 10–11*

In essentially the same manner as in Examples 1–9 excellent latices are prepared employing Emulsifiers D and E.

*Comparative Examples 12–17*

Polyvinyl acetate latices were prepared in substantially the same manner as in Example 1 except that commercially available surface active agents (emulsifiers) were substituted for the half-acid sulfosuccinate. These surface active agents are identified as follows:

SURFACE ACTIVE AGENTS (EMULSIFIERS)

F—Disodium salt of ester of sulfosuccinic acid and lauric monoethanolamide
G—Sodium lauryl sulfate
H—Alkyl benzene sodium sulfonate
I—Disodium N-octadecyl sulfosuccinamate
J—Sodium bis(tridecyl) sulfosuccinate
K—Ethylene oxide-octyl phenol adduct Table I below summarizes properties of polyvinyl acetate latices and films prepared with Emulsifiers A, B, and C as well as with commercially available Emulsifiers F to K. The method used for emulsion polymerizations was that of Example 1.

Certain properties of the resulting latices and/or films were tested according to the following procedures:

COAGULUM CONTENT OF LATICES

A 100 ml.-sample of latex is filtered through a medium mesh (44 x 35) "Common Ssense" paper-cheese cloth funnel-strainer. The funnel is kept covered to prevent evaporation and drying during filtration. After all the latex has been filtered, the filtrate is bottled and set aside for other uses as desired. The coagulum, if any, is washed with water in the funnel until the washings are but slightly cloudy. The coagulum is allowed to drain completely and then is removed and dried to constant weight in a forced draft oven. Coagulum is reported as grams per 100 ml. of latex. Little or no coagulum indicates a smooth, free-flowing latex.

VISCOSITY OF LATICES

Viscosity measurements are determined using the Ford cup method with a #4 orifice. One hundred grams of filtered emulsion is placed in the Ford Cup and the time required to drain the cup completely is noted in seconds.

MECHANICAL STABILITY

The mixing speed of a Hamilton Beach mixer, set in a 6 oz. wide jar, is adjusted to 6300 r.p.m. and a setting of about 70 volts is maintained on a connecting Variac-Autotransformer. 100 grams of latex is placed in the jar and the stirrer blade of the Hamilton Beach mixer is immersed close to the jar bottom. If desired, anti-foam agent can be added or pH adjustment can be made. A timer and the mixer are started and run for 15 minutes. (If the latex breaks or coagulates before 15 minutes, the mixer and timer are stopped.) The latex is then filtered to collect any resulting coagulum and coagulum is rinsed until the water runs clear. The coagulum is dried and weighed. Coagulum produced is recorded as grams or percent per unit time; i.e., 1 g. or 1% in 15 minutes, 10 g. or 10% in 15 minutes or 100% coagulated in 5 minutes, etc. One percent or less coagulum indicates satisfactory mechanical stability.

PARTICLE SIZE OF LATICES

A 1% solution of Formvar in ethylene dichloride is cast onto a glass slide and air-dried. The dried film is then floated off the glass into water. The film is next lifted from the water onto a small piec of 200 mesh specimen screen and dried. Several drops of highly diluted latex (0.5% solids) are then placed on the Formvar-coated, 200 mesh screen. Excess latex is removed with filter paper and the specimen dried with an air bulb. The specimen is examined in an electron microscope and the range and peak for each emulsion is reported in A. units. For coating applications a particle size of 1000 A. or less is excellent.

FILM CLARITY OR GLOSS

Strips of glass 5" x 14" are cleaned to remove all dust or haze and dried thoroughly, lint free. A 3 inch wide draw down blade of 0.002 inch wet thickness is placed on the glass and 1 to 2 grams of latex are applied to the glass in a line across the face of the blade. Draw downs approximately 3" x 5" are made with a uniform motion. The cast films are allowed to dry a minimum of 24 hours. Observations are made and recorded as to uniformity (crazing, creeping, etc.), color or other attributes of the film prior to percent haze transmission (clarity) measurements. Clarity is determined on a General Electric Integrating Sphere Hazemeter with an average of 2 readings per draw down. ASTM method D–1003 is used for the measurements. Films having a haze transmission value of less than 10 without creeping, etc. are satisfactory.

HEAT STABILITY

Heat stability (heat resistance) of films prepared by emulsion polymerization is measured in accordance with ASTM D 1925–63T. The films are prepared by drawing down the latex on a glass plate using a Bird applicator setting of 5 mils. The films are air-dried for 24 to 48 hours and then oven-dried for 2 hours at 300° F. A Hardy-G.E.-type spectrophotometer or equivalent is used to obtain the data for the test. "Yellowness" is defined as the deviation in chroma from whiteness or water-whiteness in the dominant wavelength range from 570 to 580 m$\mu$, and "yellowness index" (YI) is the magnitude of yellowness relative to magnesium oxide for CIE Source C. Positive (+) yellowness index describes the presence and magnitude of yellowness. Negative (—) yellowness index means the specimen appears bluish.

ADHESION

Cotton cloth (80 x 80 thread count) is cut into 1" x 8" strips and 3 to 4 inches of each strip is impregnated by simple immersion in the latex to be evaluated. About 2½" of the impregnated cotton strip is applied to 1" x 3" glass slides so that ½" of the glass remains dry with the dry end of the cotton strip extending beyond this end of the glass. Excess latex is removed and bonding promoted by drawing a straight edge down the length of the strip. The samples are air-dried a minimum of 24 hours prior to testing. After thorough drying, the samples are tested on an Instron tester. The ½" of the glass that is not bonded to the cotton cloth is clamped in the upper jaw of the tester. The cloth strip that hangs down is clamped into the lower jaw. Using a pulldown speed of 10 inches per minute the bond between cloth and substrate is broken. The results are recorded as pounds per inch width required to separate the bonded materials. Adhesion in the range of 1 pound per inch width is considered satisfactory. Test method and measurement conform to ASTM test method D-903.

TABLE I

| Property | Examples | | | | | | | | |
|---|---|---|---|---|---|---|---|---|---|
| | 1 | 2 | 3 | 12 | 13 | 14 | 15 | 16 | 17 |
| | Emulsifiers | | | | | | | | |
| | A | B | C | F | G | H | I | J | K |
| Coagulum, grams | 0 | 0 | 0 | 0 | 0 | 0 | 6.5 | 1.0 | 9.5 |
| Viscosity, seconds | 34 | 39 | 37 | 30 | 28 | 29 | 60 | 28 | 30 |
| Mechanical Stability, Percent Coagulum | 0 | 9 | 5.0 | 1 | Poor | Poor | Poor | Poor | Poor |
| Particle Size, A° (Peak Average) | 1,000 | 850 | 650 | 1,200 | 1,300 | 1,450 | 1,450 | 3,100 | 5,700 |
| Gloss (Percent haze of air dried films) | 1 | 3 | 1 | 5 | 7 | 2 | 16 | 29 | 13 |
| Heat Stability (yellowness index) | 2 | 1 | 2 | 3 | >100 | >100 | >100 | >100 | >100 |
| Adhesion, lbs./inch | 0.8 | 1.3 | 0.2 | 1.9 | 0.5 | 0.2 | 2.4 | 0.6 | 0.1 |

It will be seen from Table I that latices and films prepared with Emulsifiers A, B and C exhibit balanced performance with exceptionally high quality with respect to mechanical stability, particle size, gloss and heat stability as compared to results with Emulsifiers F to K. These results are particularly surprising and unexpected in view of comparative results with several of the emulsifiers such as Emulsifiers F, I and J each of which is a derivative of sulfosuccinic acid. Emulsifier F, for example, is a salt of a half-acid ester containing an amide group in the ester portion but it gives films which exhibit poorer gloss and a greater tendency to yellow. Emulsifier I differs from Emulsifiers A, B and C in that it is a sodium salt of a half-acid amide of sulfosuccinic acid. Mechanical stability of the latex and heat stability of films prepared with Emulsifier I, however, are well below the values for latices and films prepared from Emulsifier A, B and C. Emulsifier J is similar to the emulsifiers of the present invention except that it is the sodium salt of a diester of sulfosuccinic acid, i.e., in its non-salt form it lacks the free acid group of Emulsifiers A to D. Latices and films prepared from Emulsifier J suffer from the same deficiencies as in the case of Emulsifier I. The table thus demonstrates the excellence of the process and compositions of the present invention.

We claim:

1. A synthetic latex composition comprising a polymer of vinyl acetate and a minor amount of a half-acid sulfosuccinate of the structure

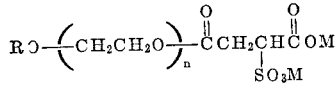

wherein R is $C_6$–$C_{20}$ alkyl or $C_8$–$C_{10}$ alkyl-substituted phenyl, M is hydrogen or a salt-forming radical, at least one M being said salt-forming radical, and $n$ is a positive integer from 1 to 30.

2. The composition of claim 1 wherein said polymer is a homopolymer of vinyl acetate.

3. The composition of claim 1 wherein said polymer is a copolymer of vinyl acetate and at least one other vinyl monomer.

4. The composition of claim 3 wherein said other vinyl monomer is 2-ethylhexyl acrylate.

5. The composition of claim 1 wherein the ester group of the half-acid sulfosuccinate is an adduct of ethylene oxide and $C_{10}$–$C_{14}$ primary straight chain fatty alcohols, said adduct comprising 40% by weight ethylene oxide.

6. The composition of claim 1 wherein the ester group of the half-acid sulfosuccinate is an adduct of ethylene oxide and $C_{10}$–$C_{12}$ primary straight chain fatty alcohols, said adduct comprising 60% by weight ethylene oxide.

7. The composition of claim 1 wherein the ester group of the half-acid sulfosuccinate is an adduct of ethylene oxide and nonylphenol in a mol ratio of about 9–10:1 respectively.

8. A polymerization process which comprises polymerizing a vinyl monomer mixture containing vinyl acetate in an aqueous medium in the presence of an amount effective for emulsion polymerization of a half-acid sulfosuccinate of the structure

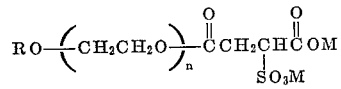

wherein R is $C_6$–$C_{20}$ alkyl and $C_8$–$C_{10}$ alkyl-substituted phenyl, M is selected from the group consisting of hydrogen and a salt-forming radical, at least one M being said salt-forming radical, and $n$ is a positive integer from 1 to 30.

9. The process of claim 8 wherein the vinyl monomers of the vinyl monomer mixture are vinyl acetate monomers.

10. The process of claim 8 wherein the vinyl monomer mixture contains vinyl acetate and at least one other vinyl monomer.

11. The process of claim 10 wherein the vinyl monomer mixture contains vinyl acetate and 2-ethylhexyl acrylate.

12. The process of claim 8 wherein the ester group of the half-acid sulfosuccinate is an adduct of ethylene oxide and $C_{10}$–$C_{14}$ primary straight chain fatty alcohols, said adduct comprising 40% by weight ethylene oxide.

13. The process of claim 8 wherein the ester group of the half-acid sulfosuccinate is an adduct of ethylene oxide and $C_{10}$–$C_{12}$ primary straight chain fatty alcohols, said adduct comprising 60% by weight ethylene oxide.

14. The process of claim 8 wherein the ester group of the half-acid sulfosuccinate is an adduct of ethylene oxide and nonylphenyl in a mol ratio of about 9–10:1 respectively.

References Cited

UNITED STATES PATENTS

| 2,109,981 | 3/1938 | Voss et al. | 260—29.6 |
| 2,125,527 | 8/1938 | Lyce et al. | 260—29.6 |
| 2,176,423 | 10/1939 | Jaeger | 252—354 |
| 2,606,165 | 8/1952 | Chapin et al. | 260—29.6 |
| 2,739,136 | 3/1956 | Kharasch et al. | 260—29.6 |
| 2,739,138 | 3/1956 | Kharasch et al. | 260—29.70 |
| 3,112,282 | 11/1963 | Jones et al. | 260—29.6 |
| 3,201,252 | 8/1965 | Knox et al. | 260—117 |
| 3,219,608 | 11/1965 | Ingleby et al. | 260—29.6 |

MURRAY TILLMAN, *Primary Examiner.*

W. J. BRIGGS, *Assistant Examiner.*